(12) United States Patent  
Hong

(10) Patent No.: US 7,513,513 B2  
(45) Date of Patent: Apr. 7, 2009

(54) METAL GRIP FOR T-BAR

(76) Inventor: Jae Hyun Hong, 16851 Knott Ave., La Mirada, CA (US) 90638

( * ) Notice: Subject to any disclaimer, the term of this patent is extended or adjusted under 35 U.S.C. 154(b) by 299 days.

(21) Appl. No.: 11/498,925

(22) Filed: Aug. 3, 2006

(65) Prior Publication Data

US 2008/0029984 A1 Feb. 7, 2008

(51) Int. Cl.
*B62M 1/00* (2006.01)

(52) U.S. Cl. .............................. 280/87.041; 280/47.315; 280/47.371

(58) Field of Classification Search ............ 280/87.041, 280/87.042, 655.1, 47.371, 47.315
See application file for complete search history.

(56) References Cited

U.S. PATENT DOCUMENTS

| | | | | |
|---|---|---|---|---|
| 4,552,372 A * | 11/1985 | Jones | ................... | 280/87.041 |
| 4,951,958 A * | 8/1990 | Chao | ................... | 280/87.041 |
| 6,318,741 B1 * | 11/2001 | Chen | ................... | 280/87.041 |
| 6,923,459 B2 * | 8/2005 | Yeo et al. | ............... | 280/87.041 |

\* cited by examiner

*Primary Examiner*—Christopher P Ellis
*Assistant Examiner*—Bridget Avery
(74) *Attorney, Agent, or Firm*—Park Law Firm; John K. Park

(57) ABSTRACT

A metal grip for T-bar according to the present invention has a T-bar, a front wheel, a front wheel fork, a board, and two or more rear wheels. The metal grip includes a locking bump and a metal grip. The locking bump is for locking the T-bar to the front wheel fork. The metal grip has a band portion, a fastening device, and a plurality of locking hooks. The T-bar is assembled to the front wheel fork for the locking bump on the T-bar to be locked between the locking hooks of the metal grip. And the band portion and the fastening device enclose and hold the assembled T-bar and front wheel fork.

15 Claims, 7 Drawing Sheets

METAL GRIP FOR T-BAR

BACKGROUND OF THE INVENTION

The present invention relates to a metal grip for T-bar for scooters.

More particularly, this invention relates to a metal grip for T-bar of Scooter that makes the T-bar not to slip around the front wheel fork.

The T-bar is connected to the front wheel fork to control the scooter right and left, hopefully without slipping.

The T-bar is usually fixed to the front wheel fork with some mechanical fasteners such as metal bands fastened by bolt and nut. The assembled front wheel fork and T-bar handle are supposed to move in a body according to the rider's control.

The fastening of the T-bar handle to the front wheel fork, however, is not so simple or easy. Maybe because of the constant vibration and agitation, the fastening gets loose easily and regularly. Such loosened fastening can be a serious problem in safety; the loose fastener causes an inoperative handle for the scooter.

Accordingly, a need for a metal grip for T-bar for scooters has been present for a long time considering the popularity of scooter as a toy. This invention is directed to solve these problems and satisfy the long-felt need.

SUMMARY OF THE INVENTION

The present invention contrives to solve the disadvantages of the prior art.

An objective of the invention is to provide a metal grip for T-bar for scooters that prevents a T-bar handle from slipping off or slipping around the front wheel fork.

Another object of the invention is to provide a metal grip for T-bar for scooters that provides a locking mechanism between the T-bar hand and the front wheel fork.

A metal grip for T-bar according to the present invention has a T-bar, a front wheel, a front wheel fork, a board, and two or more rear wheels.

The metal grip includes a locking bump and a metal grip. The locking bump, provided on the T-bar, is for locking the T-bar to the front wheel fork. The metal grip has a band portion for enclosing and holding the front wheel fork and the T-bar assembled, a fastening device connected to the band portion, and a plurality of locking hooks protruding inward from the band portion for limiting a longitudinal movement of the T-bar.

The T-bar is assembled to the front wheel fork for the locking bump on the T-bar to be locked between the locking hooks of the metal grip. And the band portion and the fastening device enclose and hold the assembled T-bar and front wheel fork.

The locking bump is provided to be aligned with the locking hooks of the metal grip when assembled. The locking bump is provided toward a rear side of the T-bar, and the locking hooks protrude toward the locking bump and inwardly from the band portion of the metal grip.

The locking bump and the locking hooks have a substantially same height.

The front wheel fork includes a main tube, an internal connecting tube portion, an external connecting tube portion, and two prongs.

The main tube has a top part, a bottom part, an interior part, an exterior part. The internal connecting tube portion, provided along the interior part of the main tube, is for accepting the T-bar. The external connecting tube portion, provided along the exterior part of the main tube, is for accepting a tubular connecting part of the board. The wo prongs, connected to the bottom part of the main tube, is for fixing the front wheel.

The top part of the main tube includes one or more semi-open slits at edges of the top part, and the semi-open slit is provided longitudinally parallel to an axis of the main tube.

The semi-open slit is adapted to accept the locking bump of the T-bar and the locking hooks of the metal grip, and the semi-open slit limits a sidewise movement of the T-bar and the metal grip.

The main tube of the front wheel fork further includes a blocking bump along an edge of the top part, and the blocking bump prevents the metal grip from slipping away when fastened.

The fastening device of the metal grip includes threads, bolt, and nut.

The metal grip is made of metal which provides elasticity and strength needed.

The locking hooks are made by cutting and bending inwardly a part of the band portion of the metal grip.

The locking hooks includes a top locking hook provided along a top edge of the band portion of the metal grip and a bottom locking hook provided along a bottom edge of the band portion of the metal grip.

The T-bar further includes a tooling hole in an opposite side of the locking bump for facilitating to make the locking bump from the T-bar. The locking bump includes a mound portion and two slits on the T-bar.

The band portion, the locking hooks, and the fastening device of the metal grip are integrated into one body.

The advantages of the present invention are: (1) the metal grip for T-bar is easy to install; (2) the metal grip for T-bar ensures no-slipping of the T-bar in the front wheel fork; and (3) the metal grip for T-bar ensures no-slipping off of the T-bar from the front wheel fork.

Although the present invention is briefly summarized, the fuller understanding of the invention can be obtained by the following drawings, detailed description and appended claims.

BRIEF DESCRIPTION OF THE DRAWINGS

These and other features, aspects and advantages of the present invention will become better understood with reference to the accompanying drawings, wherein.

DETAILED DESCRIPTION OF THE INVENTION

Figure 1:
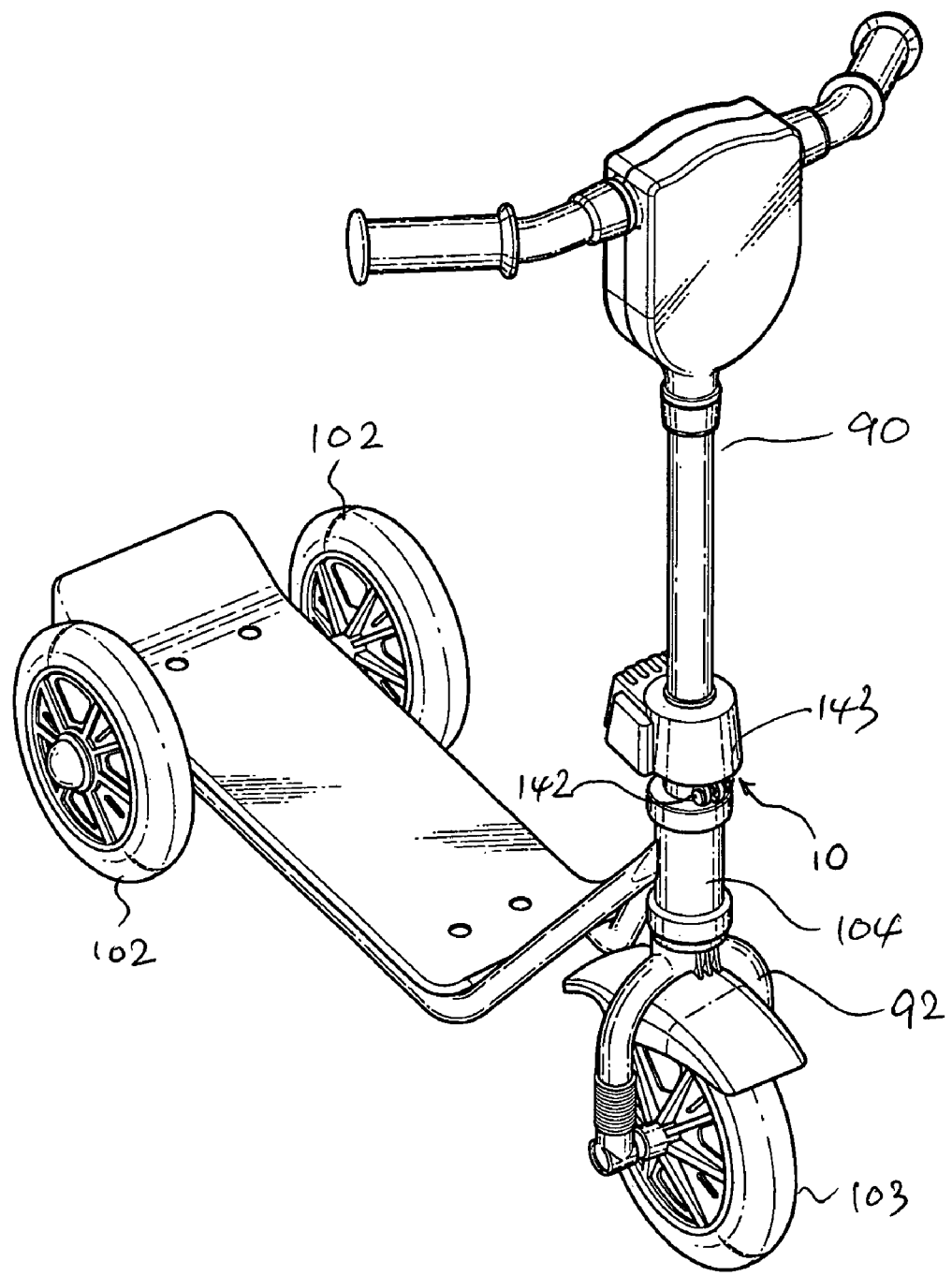
FIG. 1 is a perspective view showing a scooter with a metal grip for T-bar.

FIG. 1 shows a perspective view of a scooter 100 with a metal grip 10 according to the present invention.

The metal grip 10 for T-bar according to the present invention is for a scooter 100 having a T-bar 90, a front wheel 103, a front wheel fork 92, a board 101, and two or more rear wheels 102.

Figure 2:
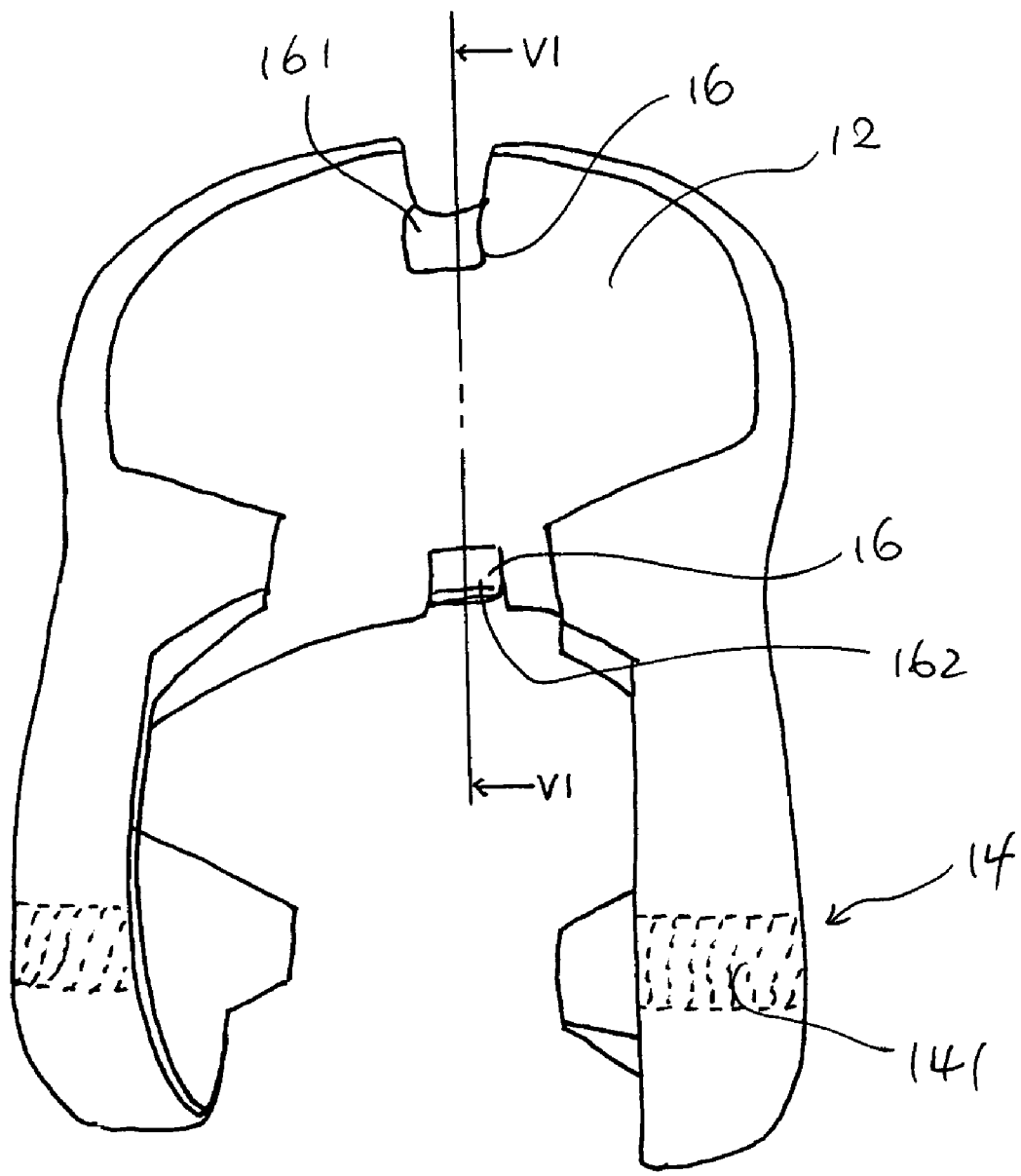
FIG. 2 is a perspective view of a metal grip for T-bar.
Figure 3:
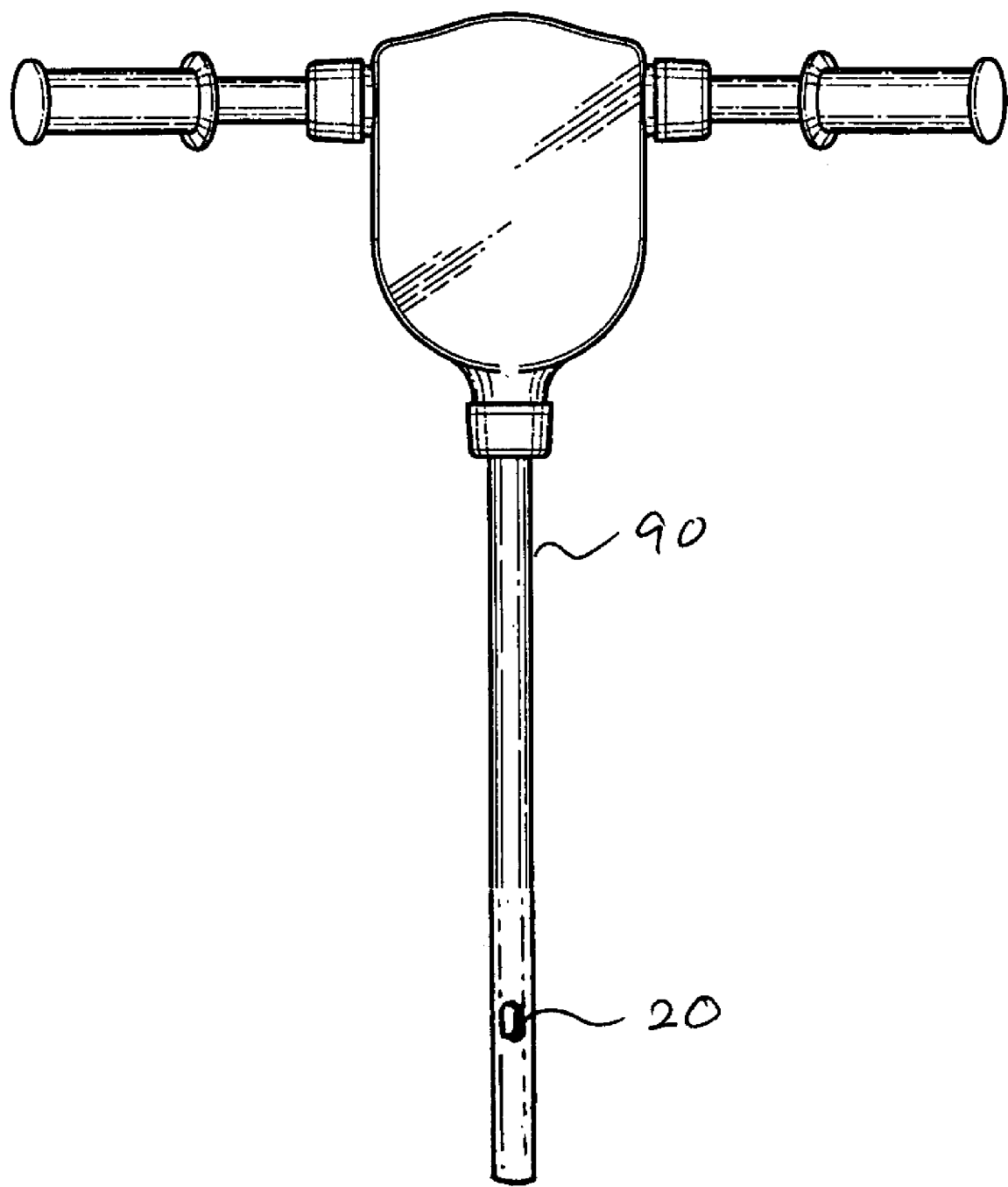
FIG. 3 is a rear plan view of a T-bar.

As shown in FIG. 2 and FIG. 3, the metal grip for T-bar according to the invention includes a locking bump 20 and a metal grip 10. The locking bump 20, provided on the T-bar 90, is for locking the T-bar 90 to the front wheel fork 92. The metal grip 10 has a band portion 12 for enclosing and holding the front wheel fork 92 and the T-bar 90 assembled, a fastening device 14 connected to the band portion 12, and a plurality of locking hooks 16 protruding inward from the band portion 12 for limiting a longitudinal movement of the T-bar 90.

The T-bar 90 is assembled to the front wheel fork T94 for the locking bump 20 on the T-bar 90 to be locked between the locking hooks 16 of the metal grip 10. And the band portion 12 and the fastening device 14 enclose and hold the assembled T-bar 90 and front wheel fork 92.

The locking bump 20 is provided to be aligned with the locking hooks 16 of the metal grip 10 when assembled. The locking bump 20 is provided toward a rear side of the T-bar 10, and the locking hooks 16 protrude toward the locking bump 20 and inwardly from the band portion 12 of the metal grip 10.

Figure 5:
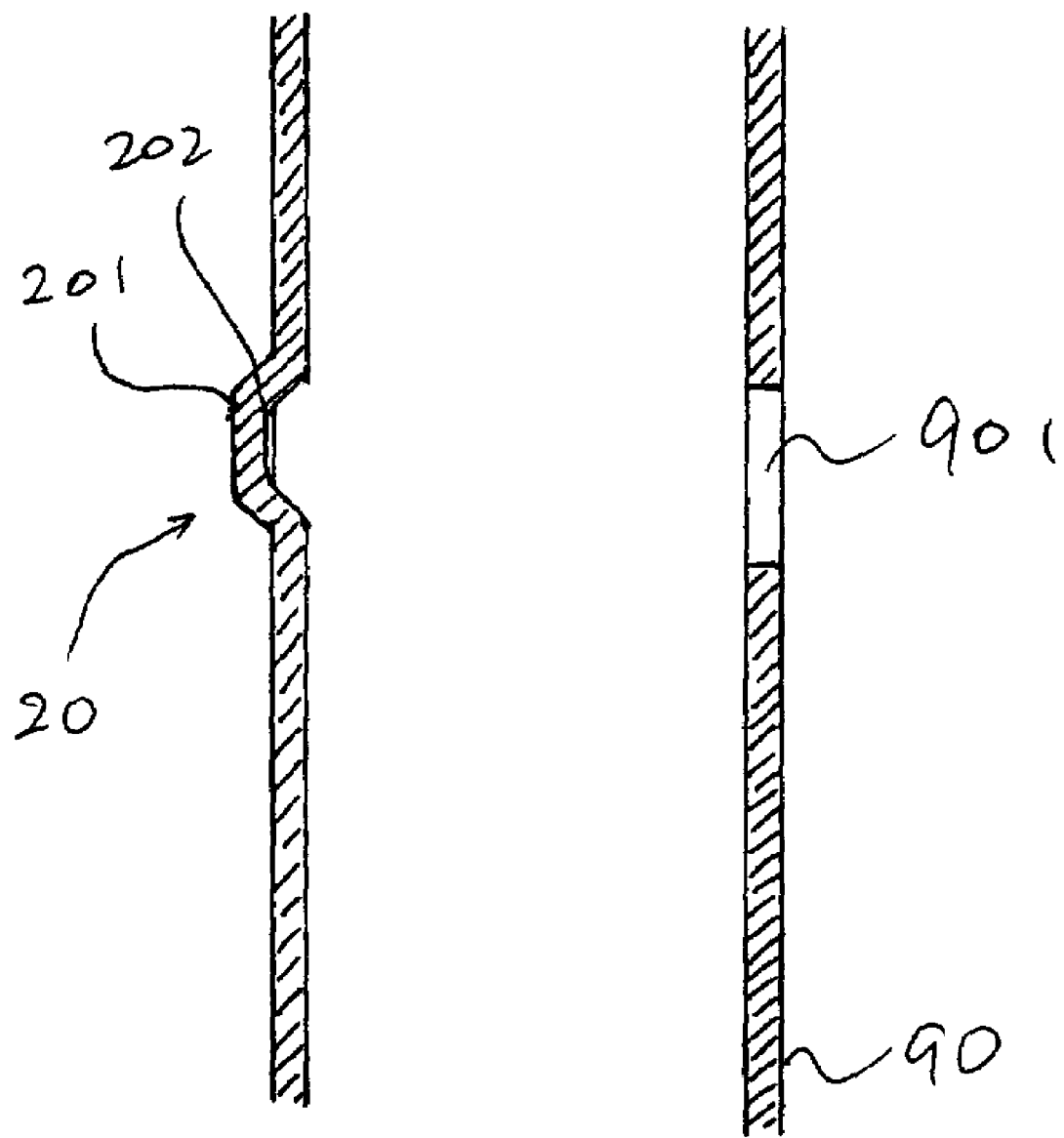
FIG. 5 is a side cross-sectional view of the lower part of the T-bar.
Figure 6:
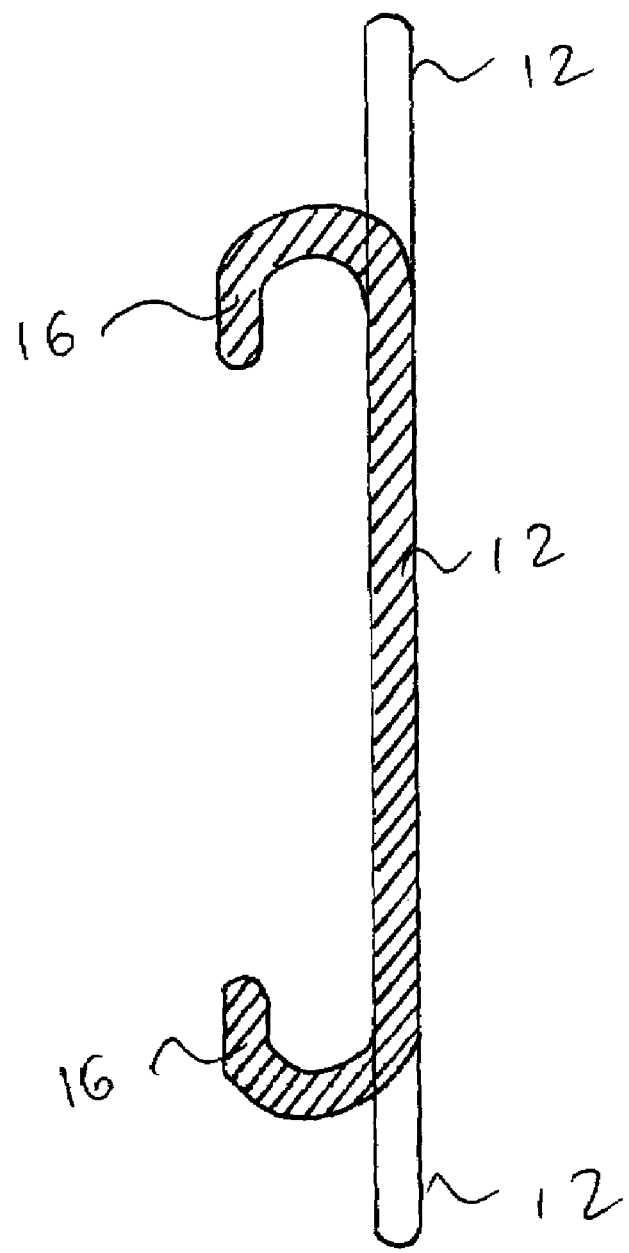
FIG. 6 is a cross-sectional view of the metal grip along the line VI-VI of FIG. 2.

The locking bump 20 and the locking hooks 16 have a substantially same height as shown in FIG. 5 and FIG. 6.

Figure 7:
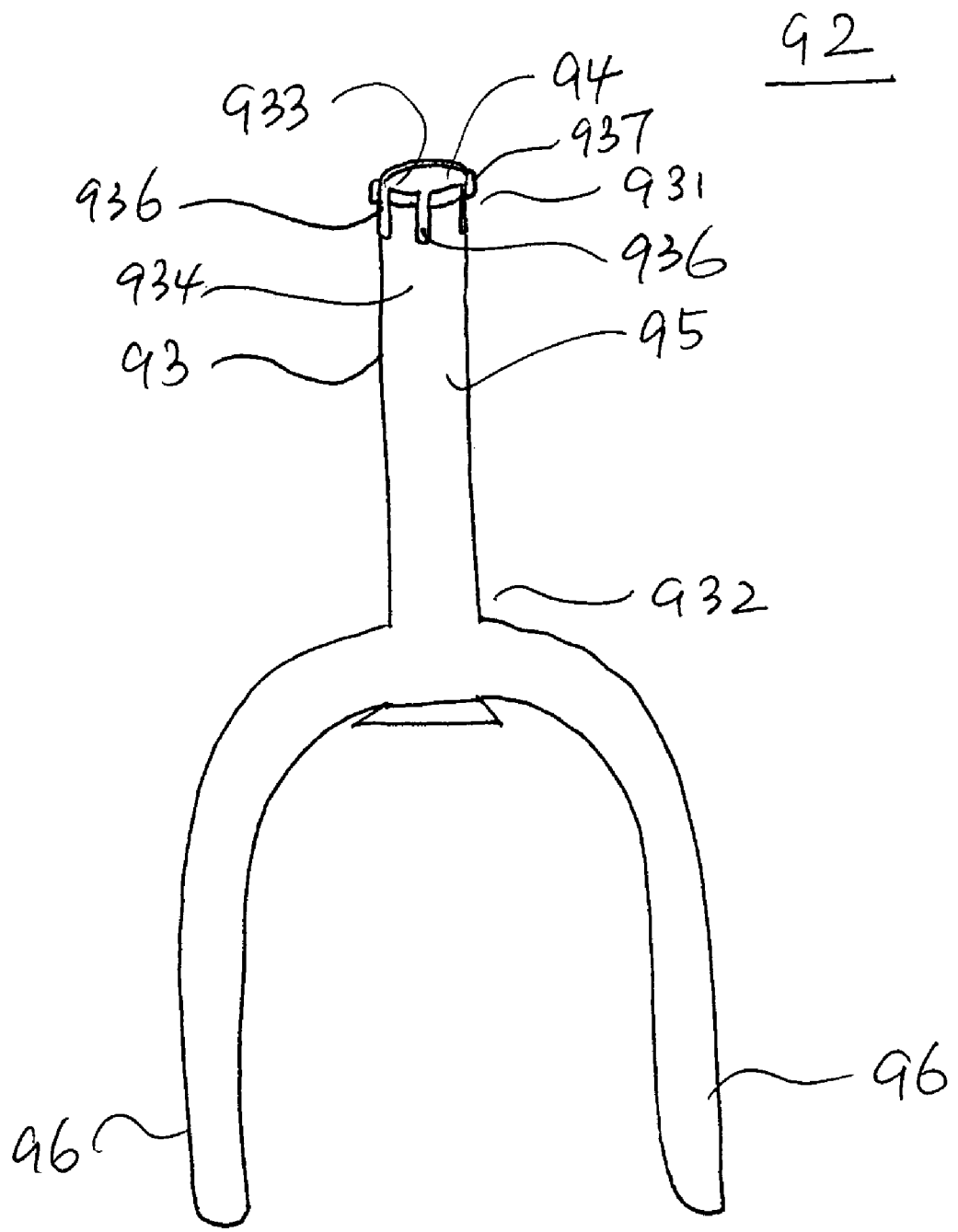
FIG. 7 is a front plan view of a front wheel fork.

The front wheel fork 92 includes a main tube 93, an internal connecting tube portion 94, an external connecting tube portion 95, and two prongs 96 as shown in FIG. 7.

The main tube 93 has a top part 931, a bottom part 932, an interior part 933, an exterior part 934. The internal connecting tube portion 94, provided along the interior part 933 of the main tube 93, is for accepting the T-bar 92. The external connecting tube portion 95, provided along the exterior part 934 of the main tube 93, is for accepting a tubular connecting part 104 of the board 101. The two prongs 96, connected to the bottom part 932 of the main tube 93, is for fixing the front wheel 103.

The top part 931 of the main tube 93 includes one or more semi-open slits 936 at edges of the top part 931, and the semi-open slit 936 is provided longitudinally parallel to an axis of the main tube 93.

The semi-open slit 936 is adapted to accept the locking bump 20 of the T-bar 90 and the locking hooks 16 of the metal grip 10, and the semi-open slit 936 limits a sidewise movement of the T-bar 90 and the metal grip 10.

The main tube 93 of the front wheel fork 92 further includes a blocking bump 937 along an edge of the top part 931, and the blocking bump 937 prevents the metal grip 10 from slipping away when fastened.

The fastening device 14 of the metal grip 10 includes threads 141, bolt 142, and nut 143 as shown in FIG. 1 and FIG. 2.

The metal grip 10 is made of metal which provides elasticity and strength needed.

The locking hooks 16 are made by cutting and bending inwardly a part of the band portion 12 of the metal grip 10.

The locking hooks 16 includes a top locking hook 161 provided along a top edge of the band portion 12 of the metal grip 10 and a bottom locking hook 162 provided along a bottom edge of the band portion 12 of the metal grip 10.

Figure 4:
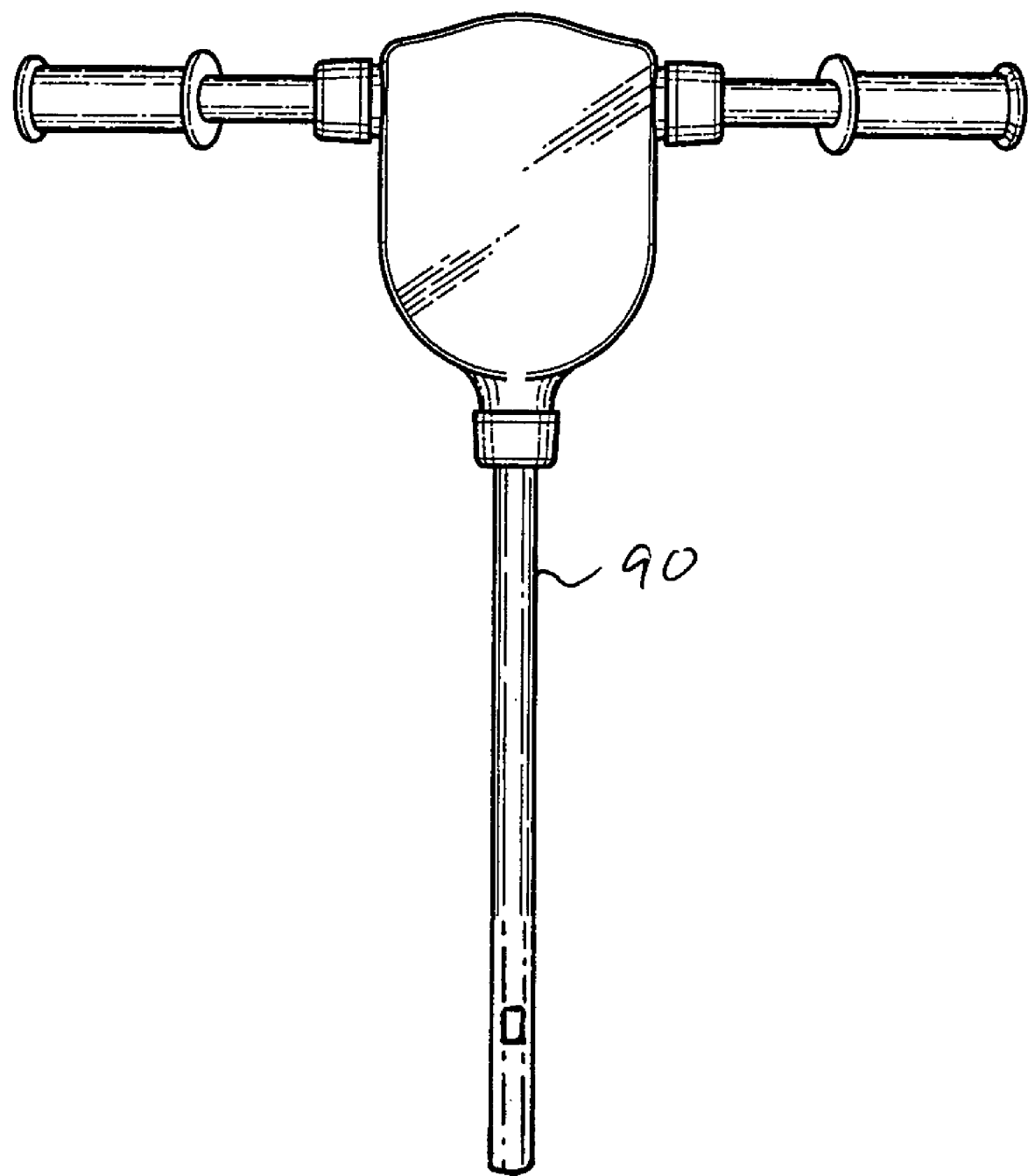
FIG. 4 is a front plan view of FIG. 3.

The T-bar 90 may further include a tooling hole 901 in an opposite side of the locking bump 20 for facilitating to make the locking bump 20 from the T-bar 90 as shown in FIG. 4 and FIG. 5. The locking bump 20 includes a mound portion 201 and two slits 202 on the T-bar 90.

The band portion 12, the locking hooks 16, and the fastening device 14 of the metal grip 10 are integrated into one body.

While the invention has been shown and described with reference to different embodiments thereof, it will be appreciated by those skilled in the art that variations in form, detail, compositions and operation may be made without departing from the spirit and scope of the invention as defined by the accompanying claims.

What is claimed is:

1. A metal grip for T-bar, for a scooter having a T-bar, a front wheel, a front wheel fork, a board, and two or more rear wheels, comprising:
    a) a locking bump, provided on the T-bar, for locking the T-bar to the front wheel fork; and
    b) a metal grip having a band portion for enclosing and holding the front wheel fork and the T-bar assembled, a fastening device connected to the band portion, and a plurality of locking hooks protruding inward from the band portion for limiting a longitudinal movement of the T-bar,
    wherein the T-bar is assembled to the front wheel fork for the locking bump on the T-bar to be locked between the locking hooks of the metal grip, wherein the band portion and the fastening device enclose and hold the assembled T-bar and front wheel fork.

2. The metal grip for T-bar of claim 1, wherein the locking bump is provided to be aligned with the locking hooks of the metal grip when assembled.

3. The metal grip for T-bar of claim 1, wherein the locking bump and the locking hooks have a substantially same height.

4. The metal grip for T-bar of claim 1, wherein the front wheel fork comprises:
    a) a main tube having a top part, a bottom part, an interior part, an exterior part;
    b) an internal connecting tube portion, provided along the interior part of the main tube, for accepting the T-bar;
    c) an external connecting tube portion, provided along the exterior part of the main tube, for accepting a tubular connecting part of the board;
    d) two prongs, connected to the bottom part of the main tube, for fixing the front wheel.

5. The metal grip for T-bar of claim 1, wherein the fastening device of the metal grip comprises threads, bolt, and nut.

6. The metal grip for T-bar of claim 1, wherein the metal grip is made of metal.

7. The metal grip for T-bar of claim 1, wherein the locking hooks are made by cutting and bending inwardly a part of the band portion of the metal grip.

8. The metal grip for T-bar of claim 1, wherein the locking hooks comprises a top locking hook provided along a top edge of the band portion of the metal grip and a bottom locking hook provided along a bottom edge of the band portion of the metal grip.

9. The metal grip for T-bar of claim 1, wherein the T-bar further comprises a tooling hole in an opposite side of the locking bump for facilitating to make the locking bump from the T-bar.

10. The metal grip for T-bar of claim 1, wherein the band portion, the locking hooks, and the fastening device of the metal grip are integrated into one body.

11. The metal grip for T-bar of claim 2, wherein the locking bump is provided toward a rear side of the T-bar, wherein the locking hooks protrude toward the locking bump and inwardly from the band portion of the metal grip.

12. The metal grip for T-bar of claim 4, wherein the top part of the main tube comprises one or more semi-open slits at edges of the top part, wherein the semi-open slit is provided longitudinally parallel to an axis of the main tube.

13. The metal grip for T-bar of claim 12, wherein the semi-open slit is adapted to accept the locking bump of the T-bar and the locking hooks of the metal grip, wherein the semi-open slit limits a sidewise movement of the T-bar and the metal grip.

14. The metal grip for T-bar of claim 12, wherein the main tube of the front wheel fork further comprises a blocking bump along an edge of the top part, wherein the blocking bump prevents the metal grip from slipping away when fastened.

15. The metal grip for T-bar of claim 9, wherein the locking bump comprises a mound portion and two slits on the T-bar.

* * * * *